Dec. 17, 1935.  L. SAIVES  2,024,538
CHANGE SPEED APPARATUS
Filed Jan. 24, 1934  2 Sheets-Sheet 1
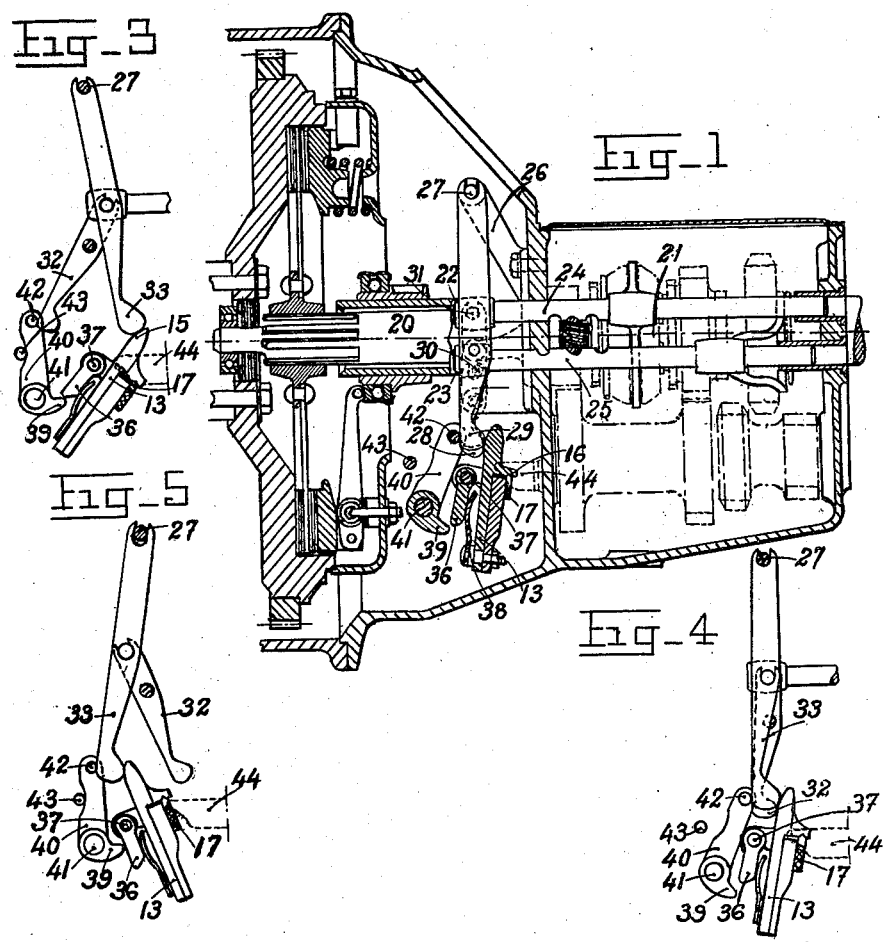

Dec. 17, 1935.   L. SAIVES   2,024,538
CHANGE SPEED APPARATUS
Filed Jan. 24, 1934   2 Sheets-Sheet 2
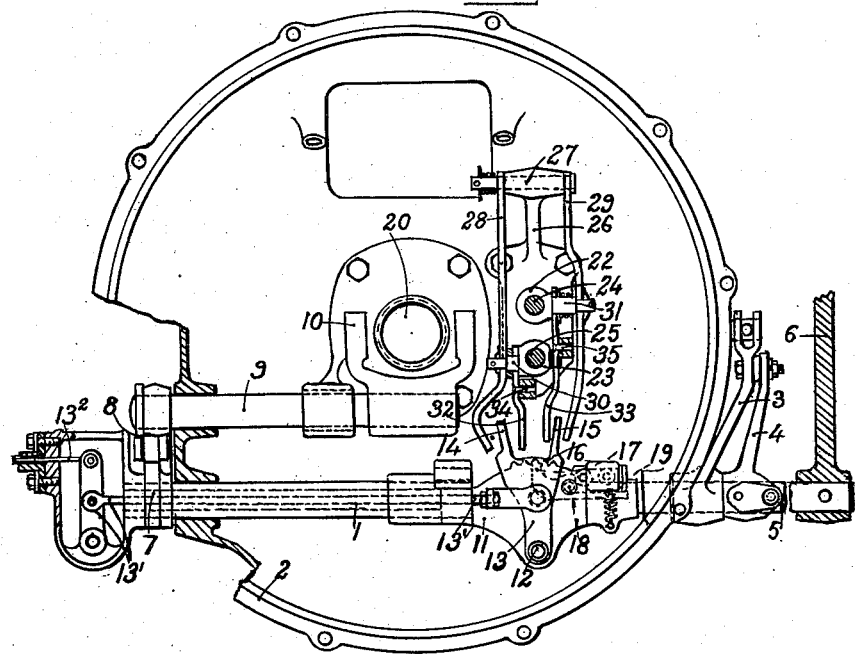

Patented Dec. 17, 1935

2,024,538

UNITED STATES PATENT OFFICE 2,024,538

CHANGE SPEED APPARATUS

Léon Salves, Billancourt, France, assignor to Louis Renault, Billancourt, France Application January 24, 1934, Serial No. 708,146
In France January 30, 1933

1 Claim. (Cl. 74—334)

The invention relates to change speed gear apparatus for all applications and more particularly to such apparatus for mounting on automobile vehicles. This apparatus is of the type known as preselector change speed gear apparatus, that is to say, in which the gear box being on a certain speed, the driver prepares in advance the speed at which he desires to proceed by displacing an easily workable member such as a handle or lever.

The preselecting arrangements may be advantageously combined with the clutch control of the vehicle and more particularly with a clutch control depending upon a cylinder subjected to a partial vacuum of the engine, in such a manner that after having chosen the speed with which it is desired to proceed, the very act of pressing on the controlling member of the vacuum servo-motor, at once disengages the clutching members then brings the speed sliding gear into engagement at the dead centre and finally engages the sliding gear of the speed with which it is desired to proceed.

The control arrangements of the sliding gears are constituted essentially by a system of fingers carried by an arm pivoted on a shaft of the declutching control, and which can be brought into different positions by a control of the Bowden type, for example. These fingers, by angular displacement of the arm, may be brought opposite to the pivoted levers at suitable points of the case of the gear box and acting on the sliding gears in such a manner that they can displace these levers and the sliding gears when they are brought opposite one of them. The arm which can be displaced angularly is provided with a spring pawl, which acts upon the projection of an intermediate lever pivoted on the case of the gear box and which carries a transverse shaft for contracting with the sliding gear engaged so as to bring it to the dead centre before the finger of the arm acts on the lever of the sliding gear to be displaced for the change in speed.

The invention likewise relates to certain details of construction which will be more particularly described hereinafter.

In the accompanying drawings:

Figure 1 is a longitudinal section along the axis of the gear box according to the invention;

Figure 2 is a transverse section of the same box;

Figures 3, 4 and 5 show the mechanism of the control arm of the sliding gears, in Figure 3 in the position corresponding to the speed in engagement, Figure 4 in the position for arresting the sliding gear in engagement, and Figure 5 in the position for a change in speed.

Referring to the drawings, the transverse shaft 1 has bearings in the casing 2 and carries the lever 3 connected to the vacuum servo-motor. This lever 3 is connected in the usual manner by a gate control with a lever 4 fixed to a shaft 5 which is located in the extension of the shaft 1 and which carries the lever 6 of the pedal or of the lever which directly controls the declutching. On the shaft 1 is keyed, outside the casing, a cam 7 which acts on a lever provided with a roller 8, the lever being carried by a shaft 9 which controls the fork 10 acting on the clutch. On the shaft 1, inside the casing 2 is fixed a support 11 on which is pivoted at 12 an arm 13 carrying fingers 14, 15. The arm 13 can take up different angular positions on its support under the action of the control $13^1$ connected to a Bowden wire $13^2$, for example, ending in a handle or lever in the driver's seat. The grooves 16 provided on the arm 13, corresponding in number to the number of positions that the arm must take up for effecting the control of the different speeds, are engaged by a catch 17 pivoted at 18 and subjected to the action of a spring 19.

In the gear box the driving shaft is indicated at 20 and the gear shaft at 21. The sliding ears 22 and 23 can slide on their respective shafts 24, 25. A support 26, fixed to the casing of the gear box, receives on a pivotal shaft 27, the levers 28 and 29. The first is pivotally connected to a collared stud 30 fixed to the lower sliding ear 23 and the second is pivotally connected to a collared stud 31 fixed to the upper sliding ear 22. On these two collared studs 30, 31 is pivoted a series of levers 32 and 33 which pivot about their fixed spindles 34, 35. The ends of the levers 28, 29 and 32, 33 are at about the same height, so as to be engaged by the fingers 14 and 15 of the arm 13 when these fingers are brought opposite to the ends of these levers by displacement of the arm 13, as will be hereinafter explained. The finger 14 can act on one or other of the levers 28 and 32, whilst the finger 15 can act on one or other of the levers 29 and 33. It is to be understood that one finger or a plurality of fingers may be used. The arm 13 carries a pawl 36 pivoted at 37 and is subjected to the action of a spring 38; this pawl can engage with the projection 39 of an auxiliary lever 40 pivoted on a spindle 41 fixed to the casing, and carrying at its free end a transverse rod 42; a fixed stop 43 is provided on the casing for the auxiliary lever 40. A rod 44 forming a latch carried by the casing fixes the catch 17 and causes it to become disengaged from the grooves 16 of the selector arm 13, during the movement corresponding to the speed change.

The operation is as follows:

If it is supposed that the change speed apparatus has, for example the second speed in engagement (position corresponding to Fig. 3), the lever 32 of the sliding ear 23, in engagement is inclined towards the left, whilst the lever 29 of the slide ear 22 of the speed to be transmitted is in the vertical position of inaction. The pawl 36 of the finger 14 is in engagement with the projection 39 of the auxiliary lever 40 which rests against its stop 43. If the driver wishes to change into the third speed, for example, he has put the control handle or lever on the index corresponding to that speed, which corresponds to the inclination of the arm 13 in the desired position in order that the finger 15 may be brought opposite to the lever 29 of the sliding ear 22. He then presses on the special pedal which controls the vacuum servo-motor which acts on the lever 3 causing it to turn the shaft 1 in a suitable direction, the cam 7 of this shaft causes the roller lever 6 of the arm 9 to turn to effect declutching by the fork 10. The declutching being maintained, the shaft 1 continues to turn and the finger 15, in turning, carries with it, by means of the pawl 36, the auxiliary lever 40 which acts by means of its transverse rod 42, on the lever 32 of the sliding gear of the speed in engagement, to bring it to the position of the dead centre, which corresponds to that indicated in Fig. 4. The pawl 36 then escapes from the projection 39 of the auxiliary lever 40. The rotary movement of the finger 15 being continued, this finger engages with the end 29 of the sliding ear 22 and displaces this lever 29 towards the front, so as to effect the displacement of the sliding ear 22 into the position corresponding to the third speed. It should be noticed that, during the change from the position of Fig. 4 to the position of Figure 5, the rod 44 acts on the body of the catch 17 so as to prevent the disengagement of this catch from the groove 16 of the arm 13 with which this catch is in engagement. The change of the third speed being effected, the control pedal of the servo-motor is released, the shaft 1 turns in a direction inversely to the movement which has previously been imparted to it and the finger 15 returns back, this lever again taking up the position shown in Fig. 3 for which the pawl 36 again engages with the projection 39 of the auxiliary lever 40.

It is seen that the mounting of the levers 28 and 32 of the sliding ear 22 and the levers 29 and 33 of the sliding ear 23, above and below the shafts of these ears, allows of communicating to the shafts of these latter, displacements in contrary directions, following the lever which is opposite the finger of the preselector arm.

The declutching pedal is used for starting, as well as for driving in towns, it can moreover be held pressed without fatigue by leaving the right foot on the button at the same time, until the moment of starting. The speed gear box can be of the usual type with a "synchronizing system" for the second and third speeds and an ordinary sliding gear for the first speed and reversing, but synchronizing arrangements could be provided for all speeds.

The forks are mounted on the locked shafts in the manner usually employed in ordinary gear boxes.

I claim:

A change speed gear apparatus with a speed preselecting arrangement comprising a shaft, means for oscillating said shaft when speed is to be changed, an arm pivoted on said shaft, means for oscillating said arm before changing speed, fingers carried by said arm, levers for operating the gear changes, said levers being arranged in such manner that one of said levers may be actuated by one of said fingers according to the positions of said arm on said shaft when the shaft is oscillated, comprising a pawl with a spring carried by said arm, an auxiliary lever having a projection actuated by said pawl, a rod operated by said auxiliary lever and bringing back said levers in such manner as to put out of mesh the gears corresponding to the speed which is to be abandoned.

LÉON SAIVES.